Patented Jan. 2, 1951

2,536,789

UNITED STATES PATENT OFFICE 2,536,789

PROCESS FOR PREPARING CHLORINATED RUBBER HYDROCHLORIDE

Gerrit Jan van Amerongen, The Hague, Netherlands, assignor to Rubber-Stichting, Delft, Netherlands No Drawing. Application August 10, 1948, Serial No. 43,534. In the Netherlands September 5, 1947

8 Claims. (Cl. 260—772)

This invention relates to a process for preparing chlorinated rubber hydrochloride by the halogenation of aqueous dispersions of rubber hydrohalides.

The principal object of the present invention is to provide a method for the production of halogenated rubber derivatives which does not require the use of solvents. Another object of the invention is to provide an economical process for the manufacture of halogenated rubber hydrohalides which have chemical and physical properties superior to the corresponding rubber hydrohalide before halogenation. A further object of this invention is to provide a procedure for the production of an aqueous dispersion of halogenated rubber hydrohalides which either may be used directly in the industrial application of the halogenated product or may be treated further to isolate the halogenated product therefrom.

It has been proposed that a chlorinated rubber hydrochloride be prepared by reacting chlorine with rubber hydrochloride dissolved in a suitable solvent. Such a method of preparation is disclosed in British Patent No. 544,387 and in United States Patent No. 2,089,398. The chlorinated rubber hydrochloride separated from the solvent has better physical properties than the rubber hydrochloride which has not been chlorinated further, but the operation of a process requiring the use of solvents involves a number of serious disadvantages including the expense of the solvent, the control which must be exercised for protection against the toxicity of the solvent and the cost of solvent recovery.

In the operation of the process of the present invention an aqueous dispersion of a rubber hydrohalide is prepared and thereafter a halogen is introduced into intimate contact with the dispersion for a time necessary to obtain the required degree of halogenation of the rubber hydrohalide at the reaction temperature employed to produce an aqueous dispersion of the halogenated rubber hydrohalide, which may be isolated from the dispersion as may be required.

One example of the operation of the process of the present invention is given for the preparation of a chlorinated rubber hydrochloride from natural latex showing a method of practising the invention. Normal latex is first saturated with hydrogen chloride according to co-pending application 784,299 in the name of Van Veersen, filed Nov. 5, 1947, and now abandoned. In this application stable aqueous dispersions (latices) of hydrochlorinated rubbers are produced by first stabilizing a natural or a synthetic hydrocarbon rubber latex to render it non-coagulable when saturated with HCl, followed by passing HCl into the so-stabilized latex in amount in excess of the quantity required to saturate the latex with HCl, thereby forming stable aqueous dispersions of hydrochlorinated rubbers having the general appearance of the latices prior to hydrochlorination. Methods are disclosed by means of which the starting latices can be satisfactorily stabilized. In one of these the latex is poured into an excess of acid until the so-called second liquid stage is reached at a pH of from 3.5 to 2.0. This method is not very satisfactory since the stabilized latex can be obtained only in low concentration and its stability is not entirely satisfactory. This method can be improved to some extent by the addition to the latex of conventional stabilizing agents, such as casein, saponin, hemoglobin and like products, which results in a hydrochlorinated dispersion of greater stability. But a method which is much more suitable owing to the fact that latices of greater stability and of higher concentration can be obtained, comprises the stabilization of the starting latex with a compatible cationic soap (cationic surface active agent). Examples of these agents are the "Fixanols" (cetyl pyridinium chloride and bromide), "Sapamine" (trimethyl-beta-oleamido-ethyl ammonium sulfate), "Soromin BS" (stearyldiguanide with some "Emulphor O," the latter being a reaction product of octadecyl alcohol and ethylene oxide), and "Igepon T"

($C_{17}H_{33}CONHC_2H_4SO_3Na$)

An equally satisfactory method, by means of which highly stable hydrochlorinated latices of high concentration can also be obtained, comprises stabilizing the starting latex with a compatible non-ionic emulsifying agent, such as "Igepal" (polymerized ethylene oxide condensation product), and "Emulphor O" (reaction product of octadecyl alcohol and ethylene oxide). Stabilization in each case is followed by passing HCl into the stabilized latices in excess of saturation, which is required to produce hydrochlorination.

The process described in the acknowledged co-pending application was used to produce a 30% latex of rubber hydrochloride containing 32.6% of chlorine. Chlorine was introduced into 30 grams of the rubber hydrochloride latex maintained at room temperature for a period of 2½ hours. The resulting chlorinated rubber hydrochloride, after coagulation from a portion of the chlorinated latex with ethanol, contained 38.1% chlorine. Chlorine was introduced again into another portion of the chlorinated rubber hydrochloride latex maintained at 100° C. for a period of 2 hours. The final chlorinated rubber hydrochloride product, after coagulation of this latter chlorinated latex with ethanol, contained 42.4% chlorine. Both products possessed characteristics which appeared to make them suitable for the manufacture of films.

A second example of the operation of this invention is given for the preparation of a chlorinated rubber hydrochloride showing particularly the effect of ultra-violet radiation upon the degree of chlorination obtained.

Chlorine was introduced into 35 grams of a 26% rubber hydrochloride (containing 32.8% chlorine) latex maintained at room temperature in a quartz tube exposed to ultraviolet light for a period of 3 hours. The resulting chlorinated rubber hydrochloride, after isolation from a portion of the chlorinated latex by centrifuging, contained 51.6% chlorine. Chlorine was introduced into another portion of the chlorinated rubber hydrocloride latex maintained at 100° C. for 2 hours. The final chlorinated rubber hydrochloride product, after isolation from this latter chlorinated latex, contained 55.0% chlorine.

A third example of the operation of this invention is given for the production of chlorinated rubber hydrochloride showing particularly the effect of irradiation with light from incandescent tungsten upon the degree of chlorination obtained. Chlorine was introduced into one portion of a 24% rubber hydrochloride (containing 28.7% chlorine) latex maintained at 20° C. and irradiated with a 100 watt tungsten lamp for a period of 3 hours. The resulting chlorinated rubber hydrochloride, after separation from the chlorinated latex, contained 45.8% chlorine. Chlorine was introduced into another portion of the 24% rubber hydrochloride latex maintained at 100° C. and irradiated with a tungsten bulb for a period of 3 hours. This chlorinated rubber hydrochloride, after separation from the chlorinated latex, contained 50.3% chlorine.

A fourth example of the operation of this invention is given for the production of chlorinated rubber hydrochloride showing particularly the effect of the chlorine content of the rubber hydrochloride of a rubber latex on the degree of chlorination obtained. Chlorine was introduced into a rubber hydrocloride (containing 9.5% chlorine) latex for a period of 3 hours while maintained at 20° C. and thereafter for a period of 2 hours while maintained at 100° C. The resulting chlorinated rubber hydrochloride, after isolation from the chlorinated latex, contained 59.3% chlorine.

It is evident that there are numerous factors which will influence conditions for the most satisfactory operation of the present invention, the actual limits of which cannot be established except by a detailed study of each set of starting materials and the intermediate and finished products involved.

The term "rubber" as used herein is understood to mean and include natural rubbers, and conjugate diolefine hydrocarbon polymer synthetic rubbers (such as polyisoprene, polydimethylbutadiene and polymethylpentadiene) and copolymers (such as copolymers of isoprene with vinyl compounds), each of which is capable of reacting with a hydrohalide to form the corresponding rubber hydrohalide and an aqueous dispersion of each rubber hydrohalide so formed is capable of reacting with a halogen to produce the corresponding halogenated rubber hydrohalide.

The halogen used in each instance is one which is reactive with the rubber hydrohalide to produce the required halogenated rubber hydrohalide, such as, for example, chlorine reacting with (natural) rubber hydrochloride to produce a chlorinated rubber hydrochloride.

The aqueous dispersion of the rubber hydrohalide is prepared, preferably, from an aqueous dispersion of the rubber employed and this aqueous dispersion maintained throughout the process, or at least to the final step of isolating the halogenated rubber hydrohalide product.

In the preparation of chlorinated rubber hydrochloride by the chlorination of (natural) rubber hydrochloride, the reaction with chlorine takes place more rapidly when there is present some rubber which has not been combined with the hydrogen chloride. The desired condition may be produced by introducing into a rubber latex hydrogen chloride in an amount less than that required theoretically to convert the rubber to the rubber hydrocloride and immediately thereafter introducing the chlorine in the presence of some free hydrochloric acid which has not reacted with the rubber.

When chlorine is the halogen used, the chlorine may react with the water of the aqueous dispersion to form hypochlorous acid which can give rise to undesirable side-reactions. The formation of hypochlorous acid is counteracted by introducing chlorine into a hydrochloride latex containing free hydrochloric acid. Therefore, the presence of uncombined hydrohalide in a rubber hydrohalide latex appears to be very favorable for the preparation of the halogenated rubber hydrohalide.

The halogen used is introduced into intimate contact with an aqueous dispersoon of the rubber hydrohalide for a time necessary to obtain the required degree of halogenation at the reaction temperature, or temperatures, employed. The halogenation temperature may vary from 0 to 100° C. Under some circumstances temperatures in excess of 100° C. may be used. Also the initial stage of the halogenation may be carried out at a low temperature and the final stage completed at a substantially higher temperature.

The halogen, particularly chlorine, may be introduced into the aqueous dispersion of the rubber hydrohalide maintained under a superatmospheric pressure to obtain a higher degree of halogenation.

When rubber hydrochloride is chlorinated, exposure to actinic radiation, such as daylight, tungsten light or ultra-violet light, causes a rapid acceleration of the chlorination reaction.

Swelling agents also may be present in the rubber hydrohalide latex during the halogenation thereof.

The halogenated rubber hydrohalide in the latex after termination of the halogenation is very finely dispersed. This latex may be used directly for industrial purposes or the solid product isolated therefrom by precipitation, flocculation, or sedimentation combined, if desired, with centrifuging or other methods of separation. Precipitating agents, such as ethanol, acetone, dioxane and sodium hydroxide, may be used.

The halogenated rubber hydrohalide product appears to have physical properties which are superior to those of the halogenated rubber hydrohalides heretofore produced. The improvement may be due to the absence of any substantial breaking down of the molecules in the aqueous dispersion which is used as the starting material.

The halogenated rubber hydrohalide product is suitable for use in the preparation of films, shaped articles and the like. When so used, suitable plasticizers, antioxidants, photoinhibitors, fillers, pigments and similar materials may be incorporated. However, if the latex is to be used, these materials may be incorporated in the latex in an emulsified or suspended form.

I claim:

1. In the manufacture of chlorinated hydrochlorides of rubber, the process which comprises preparing a stable aqueous dispersion of a rubber hydrochloride by first stabilizing a latex, selected from a class consisting of natural latex and synthetic latices of conjugated diolefine hydrocarbon rubbers, by adding a compatible stabilizing agent rendering the latex stable when saturated with HCl and then passing HCl into the so-stabilized latex in excess of the quantity required to saturate the latex, and also introducing chlorine into the stabilized latex until the hydrochlorinated latex is chlorinated, whereby an aqueous dispersion of chlorinated hydrochlorinated rubber is obtained.

2. The method according to claim 1 wherein hydrogen chloride is added to said latex in an amount sufficient to convert the rubber into the rubber hydrochloride and the chlorine is introduced immediately into the aqueous dispersion of the rubber hydrochloride before all of the rubber is converted to the hydrocloride and in the presence of uncombined hydrochloric acid.

3. The method according to claim 1 wherein the chlorine is introduced into the aqueous dispersion of the rubber hydrochloride at a temperature of from 0 to 100° C.

4. The method according to claim 1 wherein a superatmospheric pressure and superatmospheric temperature are maintained during the introduction of the chlorine into the aqueous dispersion of the rubber hydrochloride, whereby a product of higher chlorine content is obtained.

5. The method according to claim 1 wherein the chlorine is introduced into the aqueous dispersion of the rubber hydrochloride while the latter is subjected to actinic radiation.

6. The method according to claim 1 wherein the chlorinated rubber hydrochloride is separated from its aqueous dispersion after the introduction of the chlorine is terminated.

7. In the manufacture of chlorinated rubber hydrochloride, the process which comprises stabilizing a natural rubber latex by adding thereto a compatible stabilizing agent capable of stabilizing it during the subsequent hydrochlorination thereof, passing HCl into the stablized rubber dispersion to produce hydrochlorination of the rubber therein and also passing chlorine into the dispersion at a temperature of from about 0° to 100° C. until the hydrochlorinated rubber is chlorinated, whereby an aqueous dispersion of chlorinated hydrochlorinated rubber is obtained.

8. The process of claim 7 wherein the chlorine is introduced into said dispersion prior to complete hydrochlorination of the rubber.

GERRIT JAN van AMERONGEN.

REFERENCES CITED

The following references are of record in the file of this patent:

UNITED STATES PATENTS

| Number | Name | Date |
|---|---|---|
| 1,544,533 | Ellis | June 30, 1925 |
| 1,627,725 | Bradley | May 10, 1927 |
| 2,005,320 | Konrad | June 18, 1935 |
| 2,089,398 | Moffett | Aug. 10, 1937 |
| 2,331,327 | Kutz | Oct. 12, 1943 |

FOREIGN PATENTS

| Number | Country | Date |
|---|---|---|
| 476,743 | Great Britain | Dec. 15, 1937 |

Certificate of Correction

Patent No. 2,536,789 January 2, 1951

GERRIT JAN VAN AMERONGEN

It is hereby certified that error appears in the above numbered patent requiring correction as follows:

In the grant, lines 2 and 12, and in the heading to the printed specification, line 5, name of assignee, for "Rubber-Stitching" read *Rubber-Stichting*; column 4, line 40, for "dispersoon" read *dispersion*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*